United States Patent [19]

Jensen, Jr. et al.

[11] Patent Number: 4,667,570
[45] Date of Patent: May 26, 1987

[54] INTEGRAL HYDRAULIC BLOCKING AND RELIEF VALVE

[75] Inventors: Arden T. Jensen, Jr., Auburn; Bernus G. Turner, Woodinville, both of Wash.

[73] Assignee: The Boeing Company, Seattle, Wash.

[21] Appl. No.: 685,136

[22] Filed: Dec. 21, 1984

[51] Int. Cl.$^4$ ............................................. F16K 31/12
[52] U.S. Cl. ........................................ 91/420; 91/446; 137/495
[58] Field of Search ................. 91/444, 446, 461, 464, 91/465, 420, 453; 137/493, 495

[56] References Cited

U.S. PATENT DOCUMENTS

| | | | |
|---|---|---|---|
| 2,618,121 | 11/1952 | Tucker | 60/52 |
| 2,684,346 | 8/1953 | Deardorff et al. | 137/102 |
| 2,872,903 | 2/1959 | Richey | 121/40 |
| 3,046,945 | 7/1962 | Hayner | 121/41 |
| 3,067,725 | 12/1962 | Hemstreet et al. | 121/38 |
| 3,198,088 | 8/1965 | Johnson et al. | 91/420 |
| 3,349,671 | 10/1967 | Hoffman | 91/420 |
| 3,506,031 | 4/1970 | Stacey | 137/596 |
| 3,561,322 | 2/1971 | Gerstine et al. | 91/1 |
| 3,595,264 | 7/1971 | Martin et al. | 137/493 |
| 3,665,810 | 5/1972 | Parrett | 91/420 |
| 3,792,715 | 2/1974 | Parrett et al. | 137/493 |
| 3,857,404 | 12/1974 | Johnson | 137/102 |
| 3,943,968 | 3/1976 | Treichler | 91/420 |
| 4,007,666 | 2/1977 | Bauer et al. | 91/446 |
| 4,461,449 | 7/1984 | Turner | 91/420 |

*Primary Examiner*—Leonard E. Smith
*Attorney, Agent, or Firm*—Delbert J. Barnard

[57] ABSTRACT

A first path extends through the combined blocking and relief valve (10) from a first inlet/outlet port (44) to a first actuator port (88), and a second path extends from a second inlet/outlet port (46) to a second actuator port (82). The first path includes a spring biased poppet valve member (64) positioned to open in response to system pressure introduced into the valve (10) via the first inlet/outlet port (44). The second path extends between one end of a pilot piston (68) and one end of a relief piston (74). Pressure in the first path from port (44) acts on an area (A2) of the pilot piston (68) to produce a force on the pilot piston (68) tending to bias it away from the closure member (64). This same pressure is applied against an opposite side area (A5) on relief piston (74). This area (A5) is equal to the difference between the pilot valve area (A2) and the poppet valve area (A1) so that the pressure forces on the pistons (68) and (74) cancel each other out regardless of the pressure in the first path. Pressure from actuator port (88) is directed against an area on the relief piston (74) directed to move the relief piston (74) against the pilot piston (68) and the pilot piston (68) against the poppet valve member (64), to open the poppet valve (64) in response to excess pressure at the port (82).

3 Claims, 5 Drawing Figures

INTEGRAL HYDRAULIC BLOCKING AND RELIEF VALVE

DESCRIPTION

1. Technical Field

This invention relates to a control system for a hydraulic cylinder or actuator. More particularly, it relates to the provision of a combined blocking and relief valve which is adapted to relieve excess pressure in a hydraulic power cylinder at the same pressure valve whether the system pressure is "on" or "off", and which includes few parts and is easy to install.

2. Background Information

Hydraulic blocking valves are commonly employed in flight power control actuators to prevent surface motion in the event of a loss of a hydraulic system. Since the function of a blocking valve is to trap hydraulic fluid in the actuator, pressure build-up will occur with external loads and/or thermal effects, and so a pressure relief function is required. Typically the relief valve is separate from the blocking valve. However, it is known to combine together the blocking and relief functions in a similar valve. Examples of integral blocking and relief valves are shown by U.S. Pat. No. 3,943,968, granted Mar. 16, 1976, to Ernest Treichler, and entitled "Combination Lock and Relief Valve For Hydraulic Systems", and by U.S. Pat. No. 4,461,449, granted July 24, 1984, to Bernus G. Turner, and entitled "Integral Hydraulic Blocking and Relief Valve".

A characteristic of a particular valve that is in actual use in the Boeing 737 aircraft, on a spoiler, is that the pressure relief function occurs at a desired pressure (e.g. 3,900 psi.). when the system pressure is off. However, the piston which opens the blocking valve to relieve excess pressure is biased by system pressure and for this reason relieves at a much higher pressure (e.g. 6,900 psi.) when the system pressure is on. The actuator and structural components loaded thereby must then be constructed to accommodate the higher than desired working pressures and this results in a weight penalty.

U.S. Pat. No. 3,943,968 discloses a combined blocking and relief valve which has a constant relief setting regardless of system or cyinder balance pressures. The valve disclosed by this patent is similar in design to the Boeing 737 spoiler valve, except that the relief load piston is stepped and the step area is referenced to return pressure. By sizing the stepped piston so that the effective area ratio is approximately equal to the piston and poppet differential area, the design can be made to be insensitive in relief setting to system pressure. A second embodiment of a combined blocking and relief valve is known in U.S. Pat. No. 4,461,449 where relief pressure is insensitive to system pressure. A problem with these designs is that a third conduit is required to provide a return reference pressure. The need for this additional conduit encumbers the installation, takes space, and adds weight, and hence is undesirable, particularly for an installation with a remotely located control valve which operates multiple actuators with blocking valves.

DISCLOSURE OF THE INVENTION

The combined blocking and relief valve of the present invention is characterized by a first path extending from a first inlet/outlet port to a first actuator port and a second path extending from the second inlet/outlet port to a second actuator port. A poppet type blocking valve is positioned in the first path. The poppet valve includes a spring biased closure member adapted to open in response to supply pressure at the first inlet/outlet port and close in response to a loss of such pressure.

The valve includes a pilot piston and a relief piston. The second path extends between or is seated to opposing end surfaces of these pistons. When supply pressure is in the second path and the first path is connected to return, the pressure in the second path moves the pilot piston away from the relief piston, towards and against the closure member of the poppet valve, moving it into an open position.

The relief piston includes a pressure face connected to pressure at the first actuator port and oriented and sized such that an excess pressure will move the relief piston against the pilot piston and the pilot piston against the closure member, for opening the closure member to relieve the excess pressure.

The pilot piston and the closure member each presents a pressure surface towards the other. The pressure surface on the pilot piston is larger in area than the pressure surface on the closure member so a differential area exists. The relief piston includes a pressure surface which is substantially equal in area to the differential area and which is oppositely directed. All three pressure surfaces are at all times connected to pressure in the first path between the first inlet/outlet port and the poppet valve. Owing to this arrangement, the relief valve can be designed to relieve at a substantially constant pressure regardless of the pressure level in the first path between the first inlet/outlet port and the poppet valve.

The invention includes constructional details and orientation of components which are hereinafter described in the description of the best mode.

BRIEF DESCRIPTION OF THE DRAWING

Like reference numerals are used to designate like parts throughout the several views of the drawing, and.

BEST MODE FOR CARRYING OUT THE INVENTION

Figure 1:
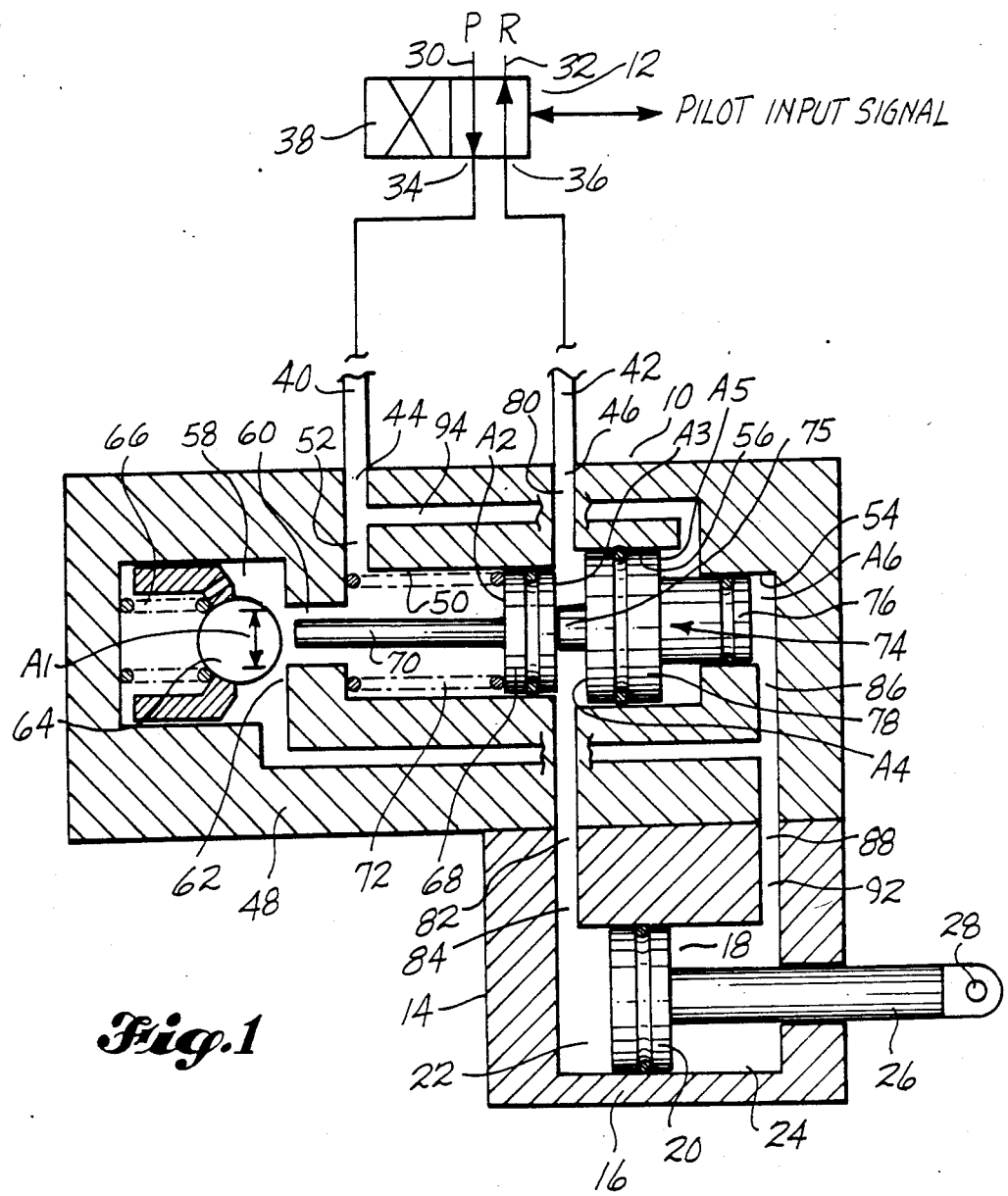
FIG. 1 is a schematic diagram of an embodiment of the system of the present invention, showing a pilot operated control valve positioned to connect system pressure to the rod side of an actuator, for retracting the actuator, and showing a poppet valve in the system in an open position, under influence of flow due to supply pressure.

Referring to FIGS. 1-5, the combination blocking and relief valve 10 of the present invention is a part of a system which includes a pilot operated control valve 12 and a double acting hydraulic cylinder or actuator 14. The control valve 12 is a two position, three-way direction valve and is shown in standard symbol form. Valve 10 and actuator 14 are shown schematically.

Actuator 14 comprises a housing 16 and a piston 18 having a head 20 which divides the interior of the housing 16 into first and second fluid chambers 22, 24. Piston 18 includes a rod 26 which extends from the piston head 20 out through an end opening in the housing 16, to a point of connection 28 to a member that is to be positioned by the actuator (e.g. a control surface of an aircraft).

The control valve 12 includes a pressure port 30, a return port 32, two output ports 34, 36, and a port control member 38. In the position shown by FIGS. 1 and 3-5, the port control member 38 is positioned to connect supply pressure P to a conduit 40 which is a part of a path to the actuator chamber 24 and connect return pressure with a conduit 42 which is a part of a path to the chamber 22 on the opposite side of the piston head 20. In its second position (FIG. 2) the port control member 38 connects supply pressure to conduit 42 and return pressure to conduit 40.

Valve 10 includes a first inlet/outlet port 44 to which conduit 40 is connected and a second inlet/outlet port 46 to which conduit 42 is connected. The housing 48 of valve 10 includes a first cavity having a first end section 50 connected to port 44 by a passageway 52, a smaller diameter second end section 54, and a larger diameter third center section 56 positioned between end sections 50 and 54.

Housing 48 also includes a second cavity 58 spaced endwise of the first cavity and connected to cavity section 50 by an internal port 60. A valve seat 62 is defined at the end of port 60 that is directed towards cavity 58. A closure member 64 is located within cavity 58. A spring 66 biases closure member 64 towards a seated position.

A first piston 68 is slidably constrained in cavity section 50. A rod 70 carried by piston 68 extends from piston 68 towards the closure member 64. A spring 72 in section 50 normally biases the piston 68 into the position shown by FIGS. 1 and 3-5. In this position the outer end of the rod 70 is contiguous the closure member 64 when the closure member 64 is seated.

A two-part second piston 74 is located in the second and third sections 54, 56 of the first cavity. A smaller diameter first portion 76 of piston 74 is slidably constrained in cavity section 54. A larger diameter second portion 78 is slidably constrained in the larger diameter cavity section 56.

Closure member 64 presents an area A1 to port 60. Piston 68 presents an area A2 to the portion of cavity section 50 on the rod side of piston 68. Piston 68 includes an area A3 on its opposite side which is directed towards piston 74. Piston 74 presents an area A4 directed towards pison 68. Piston 74 also includes an area A5 formed at the step region of piston portion 78, radially outwardly of piston portion 76. Piston 74 presents an area A6 at its end opposite area A4.

A passageway 80 extends from port 46 through a region of the first cavity between pistons 68 and 74 to a first actuator port 82. A small diameter extension 75 on piston 74 maintains a space between area A3 and area A4. Actuator port 82 is connected by a passageway 84 to chamber 22 of actuator 14. A passageway 86 connects the outer end portion of cavity section 54 to a second actuator port 88. A passageway 90 connects the second cavity 58 to actuator chamber 24 via a portion of passageway 86, port 88 and an internal passageway 92 in the actuator 14.

Assume an initial position in which the piston 20 of actuator 14 is fully extended and it is desired to retract the piston 20. The pilot moves the selector valve 12 from the position shown by FIG. 2 into the position shown by FIG. 1. This connects a supply pressure P to actuator chamber 24 via port 34, conduit 40, port 44, passageway 52, cavity section 50, port 60, cavity 58, passageway 90, passageway 86, port 88 and passageway 92. Hereinafter this will be referred to as the first path. It also connects actuator chamber 22 to a return pressure R via passageway 84, port 82, passageway 80, port 46, conduit 42 and port 36. Hereinafter this will be referred to as the second path.

Supply pressure P within cavity section 50 acts against area A1 of closure member 64. In the opposite direction it acts against area A2 of piston 68. According to the invention, a passageway 94 connects supply pressure P from port 44 to area A5. Area A5 is substantially equal to the area A2 minus A1. As a result, the pressure forces on pistons 68 and 74 are equal but opposite and as a result the pistons 68 and 74 do not move. The pressure P acts on area A1 to open closure member 64. Once closure member 64 is unseated, system pressure P is connected to the actuator chamber 24.

Figure 2:
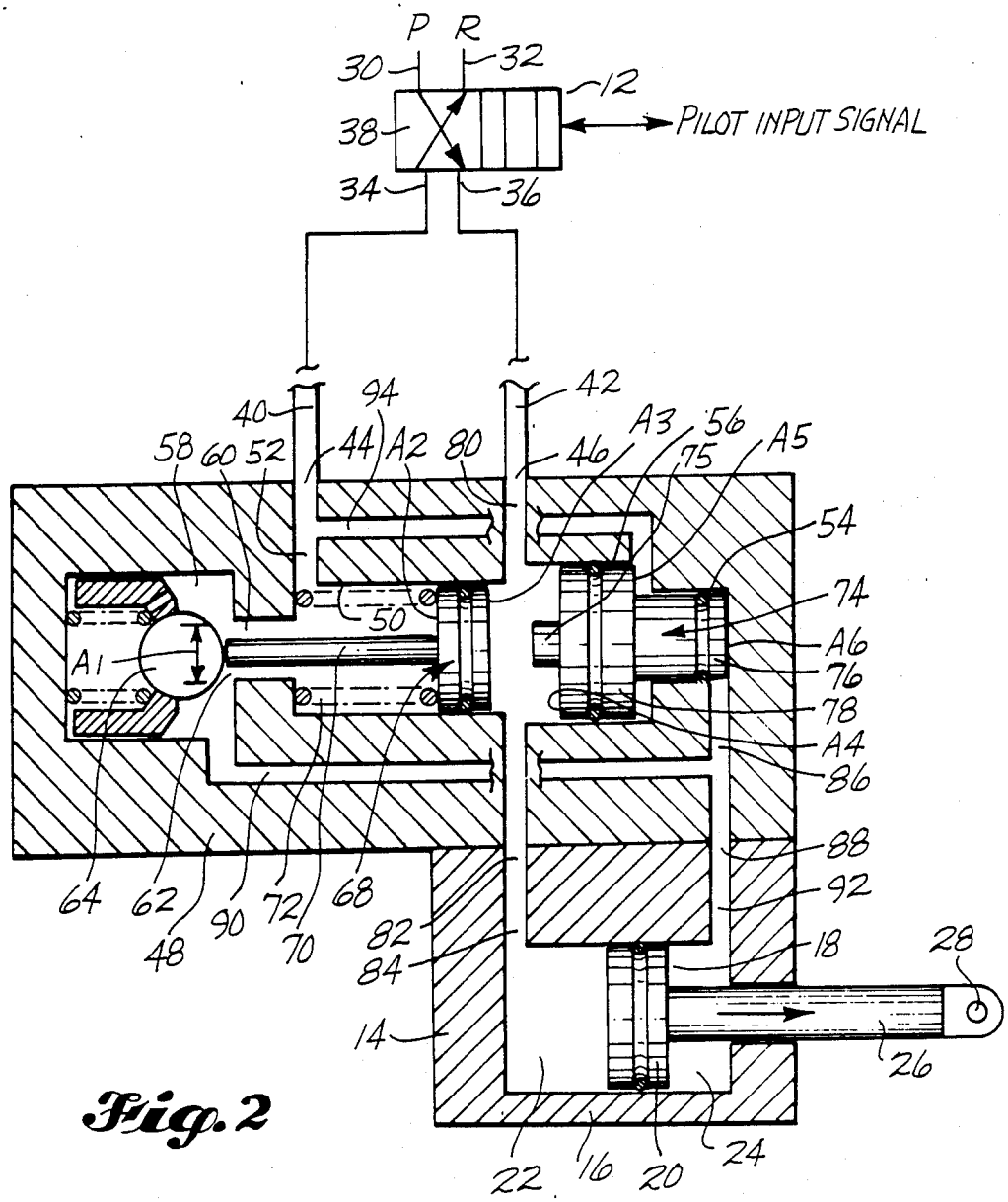
FIG. 2 is a view like FIG. 1, but showing the control valve shifted to reverse flow to the chambers of the actuator, for extending the actuator.

When it is desired to extend the piston 20, the pilot shifts valve 12 into its second position which is shown by FIG. 2. In this position the supply pressure P is connected to actuator chamber 22 via the second path. The system pressure P acting on area A3 moves the piston 68 to the left, causing rods 70 to contact closure 64 and move it into an open position. Actuator chamber 24 is then connected to return pressure via the second path.

Figure 3:
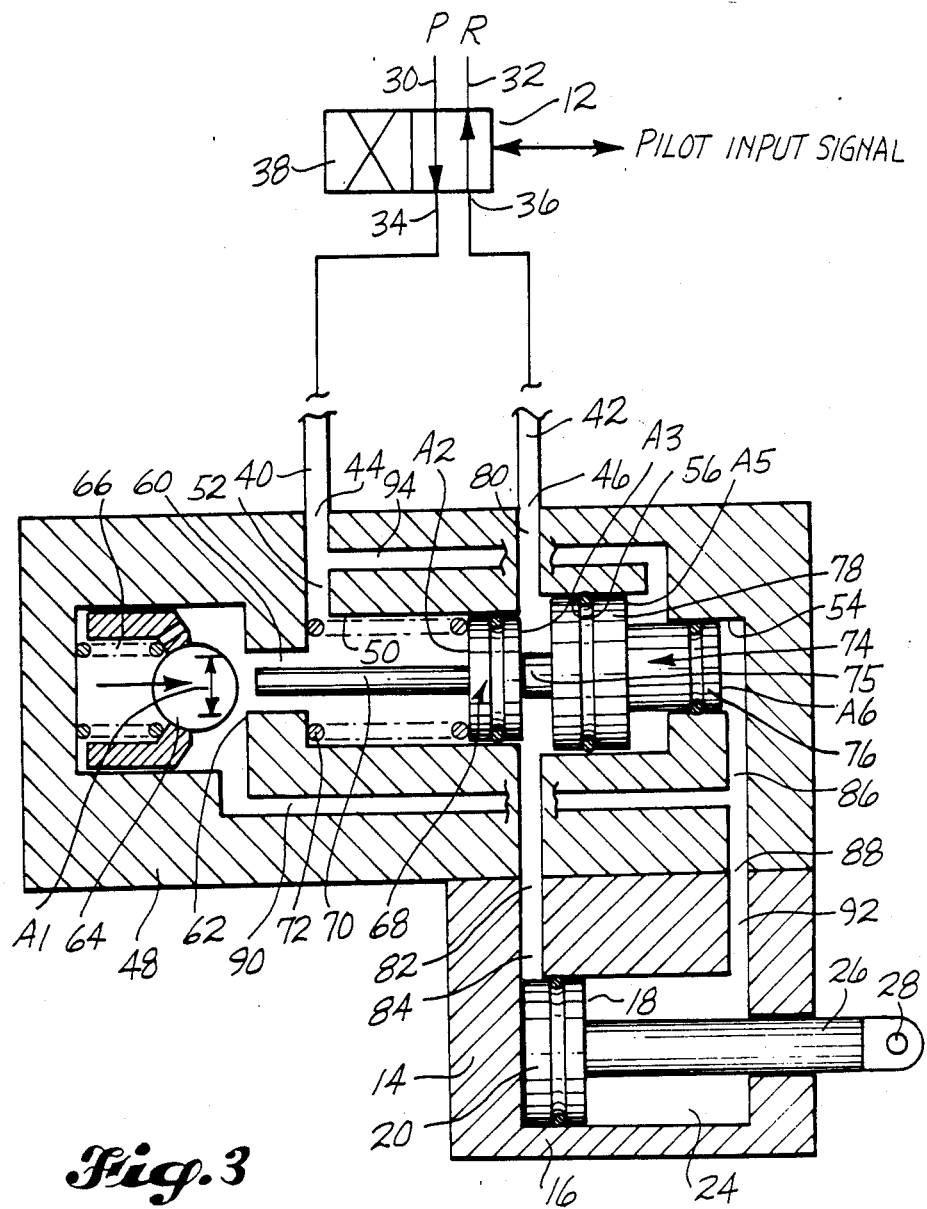
FIG. 3 is a view like FIGS. 1 and 2, but showing the actuator fully retracted, with supply pressure to the actuator maintained, and showing the poppet valve closed by its spring in the absence of flow.
Figure 4:
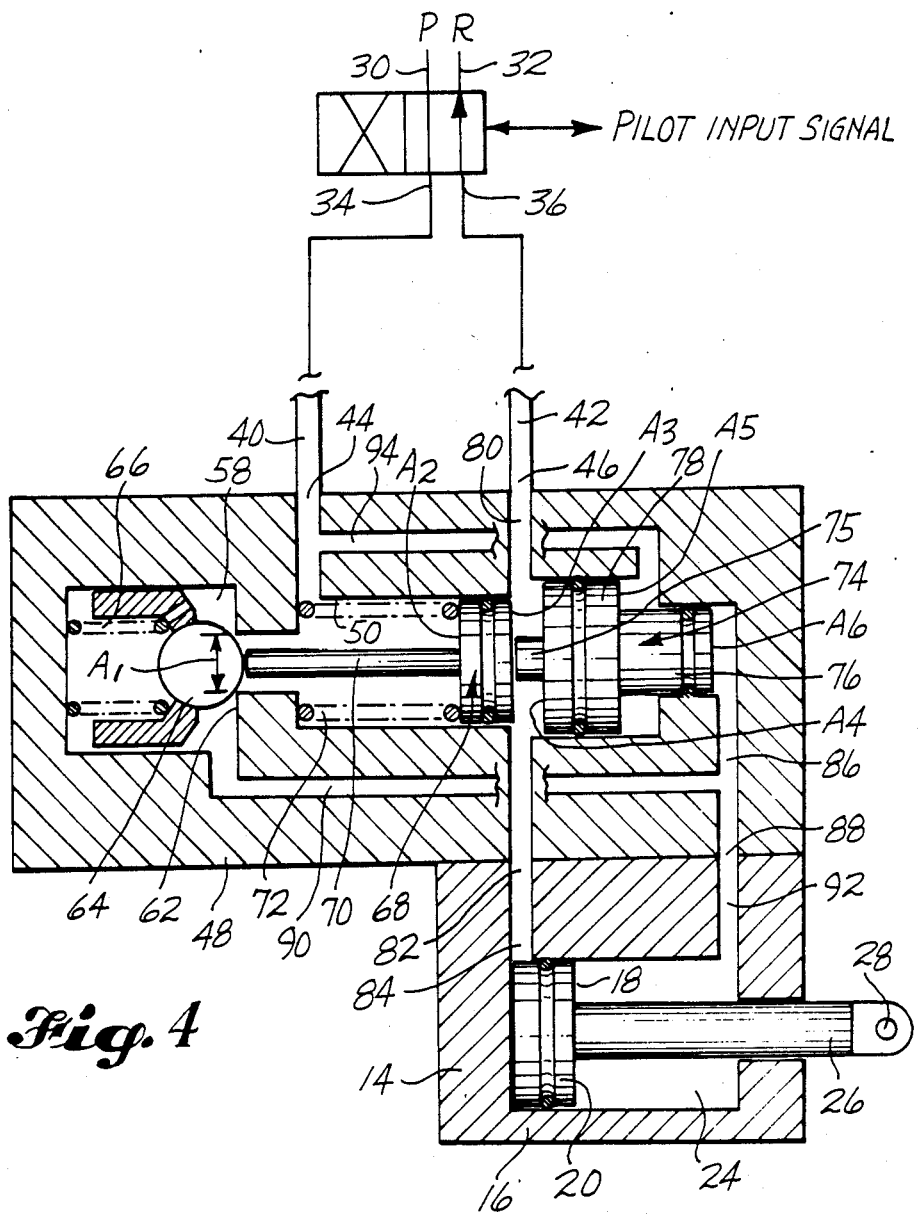
FIG. 4 is a view like FIG. 3, but showing a loss of supply pressure upstream of the poppet valve.

FIG. 1 shows piston 20 in the process of being retracted. FIG. 3 shows piston 20 fully retracted and being held in this position by the supply pressure P acting through the first path. Once the piston 20 is fully retracted, flow stops and the spring 66 seats closure member 64. If for any reason supply pressure should be lost, port 34 will be at return pressure. This menas that conduit 40, port 44, passageway 52 and cavity chamber 50 become connected to return pressure R. If and when this condition exists, closure member 64, still seated by spring 66, will prevent fluid flow out from actuator chamber 24 via the first path. This condition is illustrated in FIG. 4.

Figure 5:
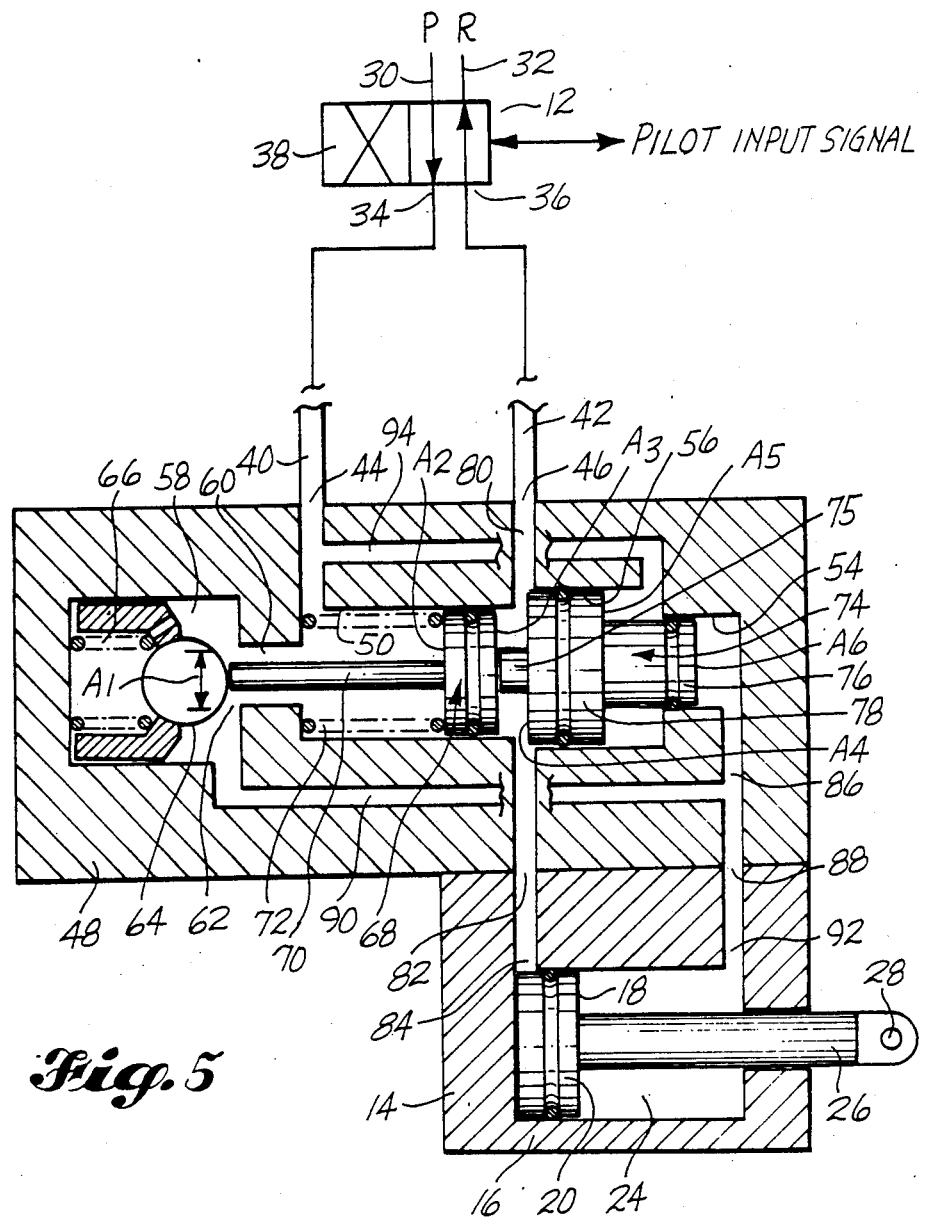
FIG. 5 is a view like FIG. 3, but showing the combined relief valve portion of the system functioning to relieve pressure from the rod side of the actuator.

Referring to FIG. 5, if the actuator piston 20 is fully retracted and an increase of temperature of the hydraulic fluid and/or an external load acting on piston rod 26 acts to increase the pressure within chamber 24 to too high a level, the valve 10 will function to relieve the excess pressure. If supply pressure P is at port 44, it is directed against both area A2 and A5. The pressure within chamber 24 acting on area A6, will cause pistons 68, 74 to move together to the left (as pictured). Rod 70 is moved to contact closure member 64 and open it enough to relieve pressure in chamber 24. If port 44 is at return pressure (FIG. 4), return pressure is against both area A2 and area A5. The excess pressure in chamber 24 acts on area A6, moving piston 68 and piston 74 together, to the left as pictured, causing rod 70 to contact closure member 64 and move it into an open position. It remains in this position until the excess pressure is relieved from chamber 24 via the first path through the valve 10.

In summary of the foregoing, the valve of the present invention incorporates a unique floating compensating piston 74 which provides a not heretofore conceived combination of functions as follows:

(1) The piston area A6 works in concert with the area A1 of the poppet valve closure member 64 and the springs 66, 72, to determine the relief pressure setting, and (2) The piston area A5 provides the exact reverse pressure bias necessary to cancel the effect of presssure in cavity section 50 acting on the "excess" portion of area A2 (e.g. A2 minus A1).

It is a key point of the invention that the net area of the floating compensation piston exposed to system pressure (i.e. area A5) is equal to the "excess area" of the pilot piston 68 simultaneously exposed to pressure in cavity section 50. It is this feature which provides pressure compensation for relief valve operation.

By separating the compensating piston function from the pilot piston function, a dual-purpose cavity is created between piston 64 and 74 which acts to:

(1) Provide a return reference for the relief or blocking functions (with either actuator "retract" command or a depressurized system) and (2) Provide a pilot function to open poppet valve closure member 64 (with an actuator "extend" command, pressure is applied to the pilot piston area A3).

It is this dual-purpose cavity which may be seen to eliminate the need for a second return conduit.

It is to be understood that the particular embodiment of the combined blocking and relief valve which has been illustrated and described is merely to serve as an example of the invention. The scope and content of the invention are to be determined by the claims which follow, interpreted by the established rules of claim interpretation, including the doctrine of equivalents.

What is claimed is:

1. In a system which includes a double acting hydraulic actuator with fluid chambers on opposite sides of a piston, and a control valve for selectively connecting one of the chambers to supply pressure and the other to return pressure, a combined blocking and relief valve adapted to be positioned in the system between the control valve and the actuator, comprising:

housing means defining a first path from a first inlet/outlet port to a first actuator port, and a second path from a second inlet/outlet port to a second actuator port;

a poppet valve in the first path comprising a spring biased closure member having a pressure surface and adapted to open in response to supply pressure from the first path via the first inlet/outlet port acting on said pressure surface;

a pilot piston and a relief piston within said housing, said second path extending between the pilot piston and the relief piston, and said pilot piston being adapted to move against and unseat the closure member of the poppet valve in response to supply pressure in the second path and return pressure in the first path;

passageway means connecting the first actuator port with a surface on the relief piston directed to create a force on the relief piston for displacing it against the pilot piston and the pilot piston in turn against the closure member of the poppet valve, in response to excess pressure in said passageway means;

said pilot piston presenting a first path pressure surface towards the first path between the first inlet/outlet port and the poppet valve which is larger than the pressure surface of the closure member and which is subjected to pressure entering the first path via the first inlet/outlet port; and said relief piston including a first path pressure face connected to receive pressure entering the first path via the first inlet/outlet port which is oriented and sized to produce a presssure created force on the relief piston which is substantialy equal and opposite to the pressure created force acting on said first path pressure face of the pilot piston.

2. In a system which includes a double acting hydraulic actuator with fluid chambers on opposite sides of a piston, and a control valve for selectively connecting one of the chambers to supply pressure and the other to return pressure, a combined blocking and relief valve adapted to be positioned between the control valve and the actuator, comprising:

a housing defining a first path through the valve to a first side of the actuator, and a second path through the valve to the second side of the actuator;

a poppet valve in said first path, including a valve seat, a closure member on the actuator side of the valve seat, and means biasing the closure member towards the valve seat;

a first piston within said housing on the opposite side of the closure member from the biasing means, said first piston including a rod which extends from the piston towards the closure member, said first piston including a first pressure surface on its rod side which is subjected to pressure within the first path upstream of the poppet valve, and a second pressure face on its opposite side which is subjected to pressure within the second path;

a floating second piston within said housing, having a large diameter first portion with inner and outer ends and a small diameter second portion with inner and outer ends, a third pressure face at the outer end of said first portion which is subject to pressure within the second path, a fourth pressure face at the inner end of the first portion which is subject to pressure in the first path upstream of the poppet valve, and a fifth pressure face at the outer end of the second portion which is subject to pressure within the first path downstream of the poppet valve; and spring means biasing the first piston away from the closure member and towards the second piston.

3. A combined blocking and relief valve for a hydraulic actuator which has first and second fluid chambers on opposite sides of a piston, said valve comprising:

a housing including a first cavity having a first diameter first section at one end of the cavity, a second, smaller diameter second section at the opposite end of the cavity, and a third section positioned between the first and second sections which is larger in diameter than the first section, said third section having a first end where it meets the first section and a second end where it meets the second section;

a second cavity spaced from the first cavity;

an internal port extending between the first section of the first cavity and said second cavity;

a valve seat defined at the second cavity end of said internal port;

a closure member in said second cavity;

spring means in said second cavity biasing said closure member towards said valve seat;

a first piston within the first section of the first cavity, said piston including a rod projecting from the piston towards the closure member, said rod extending through said internal port being smaller in diameter than said internal port, said first piston presenting a first pressure face towards the first section of the first cavity and a second pressure face towards the third section of the first cavity;

a second piston having a first portion in the third section of the first cavity and a second portion in the second section of the first cavity, said second piston presenting a third pressure face towards the first end of the third section, and presenting a fourth pressure face in the opposite direction, towards the second end of said third section, and presenting a fifth pressure face to the second section;

said housing including:

a first inlet/outlet port;

a second inlet/outlet port;

a first actuator port;

a second actuator port;

first passageway means extending from the first inlet/outlet port to the first section of the first cavity, between the internal port and the first pressure face;

a second passageway extending from the first inlet/outlet port to the second end of the third section of the first cavity;

a third passageway extending from the second inlet/outlet port to the first end of the third section of the first cavity;

a fourth passageway extending from the first end of the third section of the first cavity to the first actuator port;

a fifth passageway extending from the second section of the first cavity to the second actuator port;

a sixth passageway extending from the second actuator port to the second cavity; and wherein in use the first and second inlet/outlet ports are connected to a control valve which communicates the first inlet/outlet port to supply pressure and the second inlet/outlet port to return pressure, or connects the second inlet/outlet port to supply pressure and the first inlet/outlet port to return pressure, or blocks flow to both of these ports, and where the first actuator port is connected to the fluid chamber on one side of the piston in the actuator and the second actuator port is connected to the second chamber of the actuator on the opposite side of the piston.

* * * * *